United States Patent [19]

Maier

[11] 4,059,373

[45] Nov. 22, 1977

[54] EXTRUDER HEAD

[75] Inventor: Rudolf Maier, Heidenheim, Germany

[73] Assignee: J. M. Voith GmbH, Heidenheim, Germany

[21] Appl. No.: 676,464

[22] Filed: Apr. 13, 1976

[30] Foreign Application Priority Data

Apr. 26, 1975 Germany .............................. 2518649
Oct. 10, 1975 Germany .............................. 2545415

[51] Int. Cl.$^2$ .............................................. B29F 3/04
[52] U.S. Cl. .................................. 425/192 R; 425/380; 425/467
[58] Field of Search .................... 264/DIG. 33, 209; 156/500; 425/197, 199, 380, 381, 466, 467, 192, DIG. 206, 133.1, 462, 464, 190; 72/264

[56] References Cited

U.S. PATENT DOCUMENTS

| 2,753,596 | 7/1956 | Bailey ............................ 425/464 X |
| 3,386,132 | 6/1968 | Fischer .............................. 425/381 |
| 3,756,758 | 9/1973 | Prall ............................ 425/467 X |

*Primary Examiner*—Francis S. Husar
*Assistant Examiner*—Mark Rosenbaum
*Attorney, Agent, or Firm*—Peter K. Kontler

[57] ABSTRACT

An extruder head for supplying tubular parisons to a blow molding machine has a cylindrical outer housing, an inner housing extending into the rear end portion of the outer housing, a core which defines with the outer housing an annular extrusion orifice and an annular compartment which supplies plasticized synthetic thermoplastic material to the orifice, and a holder which secures the core to the inner housing so that plasticized material can flow from an axially extending channel of the inner housing into the rear portion of the compartment between the core and the outer housing. The holder has a cupped section between the core and the inner housing, a first annulus of bolts which connect the section to the inner housing and a second annulus of bolts which connect the section to the core. The section has a central opening and the bolts are parallel to the axis of the core. Some plasticized material which is supplied by the channel flows radially outwardly through a rear chamber between the inner housing and the core whereby such material flows through the gaps between neighboring bolts of the first annulus and toward and into the compartment. The remainder of the material which is supplied by the channel flows from the rear chamber through the opening of the section and thereupon readially outwardly through a front chamber between the section and the core whereby such material passes through gaps between neighboring bolts of the second annulus before it reaches the compartment.

15 Claims, 4 Drawing Figures

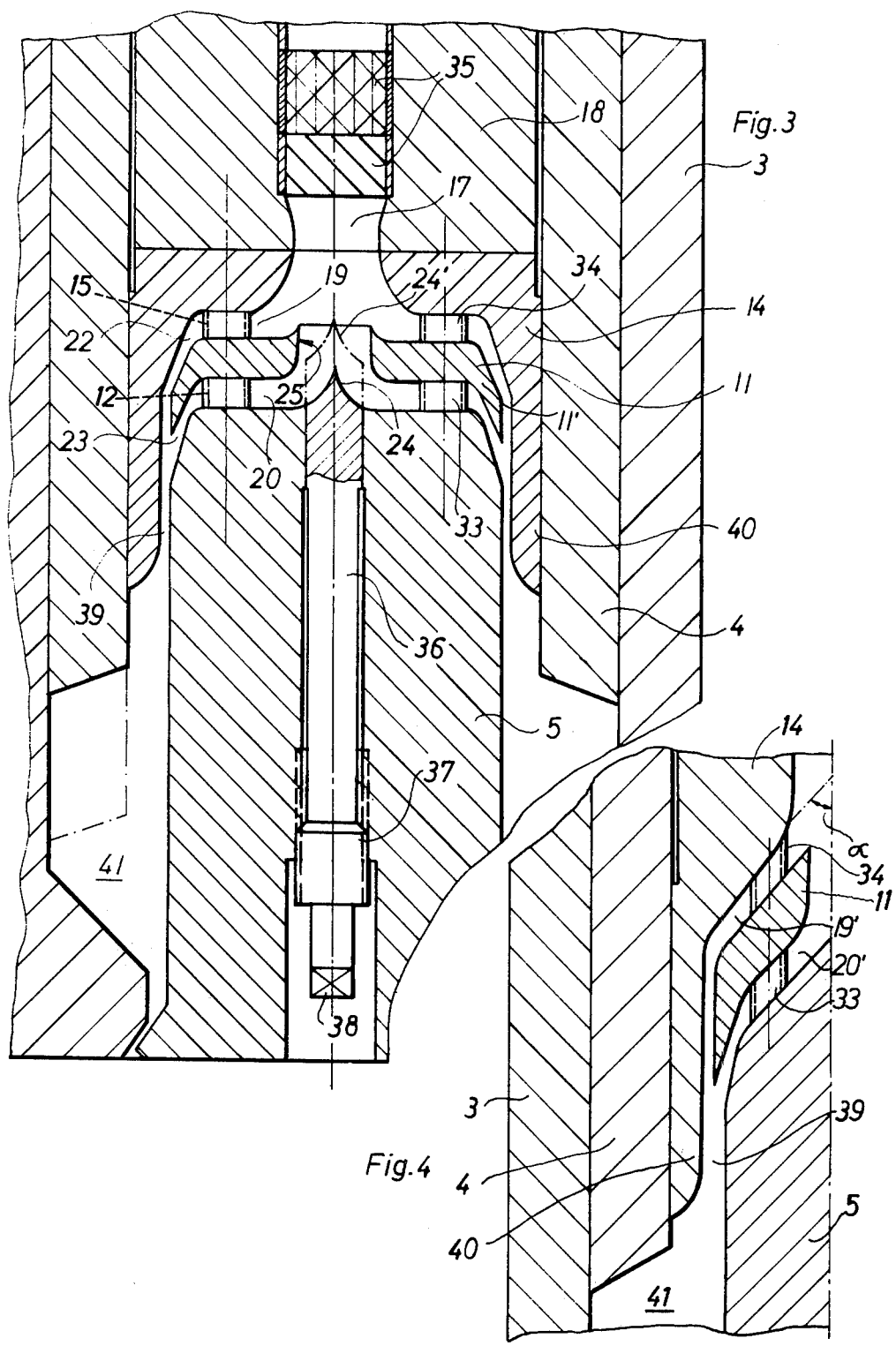

EXTRUDER HEAD

BACKGROUND OF THE INVENTION

The present invention relates to machines for making shaped articles from synthetic thermoplastic material, and more particularly to apparatus for extruding tubular parisons (especially pendant parisons) which can be converted into pipes, bottles, vials, cans or other types of hollow articles, e.g., by resorting to a blow molding technique. Still more particularly, the invention relates to extruder heads.

The head of an extruder apparatus which furnishes parisons to one or more open-and-shut molds of a blow molding machine normally comprises an outer housing and an inner housing which latter supports a core in such a way that the core and the outer housing define an orifice for extrusion of a tubular parison. The core is secured to the inner housing by several radially disposed spokes so that the plastic material, which flows from a channel of the inner housing into an annular compartment between the outer housing and the core, must pass through the openings between neighboring spokes and is thereby divided into a plurality of discrete streams. The means for holding the core in requisite position with respect to the outer housing must withstand extremely high stresses ranging up to and in excess of 1,000 tons (depending on the size of the extruder head). In order to avoid streaking of the mass which advances toward the extrusion orifice, the material is normally caused to flow through two concentric chambers each of which contains a set of radial spokes, and the spokes of one set are angularly offset with respect to the spokes of the other set. If the extruder head is formed with a space for a supply of plastic material in front of an axially movable piston which can be pushed back by plastic material in the space, there remains very little room for installation of the core holder (as considered in the radial direction of the head). Consequently, and in view of the magnitude of forces acting on the core, the spokes (and hence the openings between neighboring spokes) are relatively long. This, in turn, causes the plastic material to offer a high resistance to the flow through such openings. The resulting pressure losses can amount to 120 atmospheres superatmospheric pressure. Another drawback of relatively long spokes and openings is that the period of dwell of plastic material in the openings is relatively long. Owing to elastic memory of plastic material (as a result of molecular orientation of thermoplastic material having a high molecular weight), the diameter of the parison invariably deviates from an optimum diameter.

Proposals to enlarge the diameter of the extruder head so as to provide room for several openings of relatively large cross-sectional area and for relatively bulky and strong spokes between the openings have met with limited success. Thus, if the extruder head is to furnish a small-diameter parison, the diameter of plastic mass which has advanced radially outwardly beyond the openings must be reduced before the mass reaches the extrusion orifice. Due to its elastic memory, the material of the parison expands as soon as it issues from the orifice so that the diameter of the expanded parison exceeds the desired diameter. Secondly, the manufacturing cost of extruder heads with relatively long openings between radial spokes is very high, especially since, owing to the high pressures involved, the component parts of the head must be made of high-quality material. The tolerances which can be achieved with available milling machines are unsatisfactory; therefore, the openings between the spokes must be formed by resorting to a costlier technique, e.g., to spark erosion. However, even such complex techniques cannot insure necessary uniformity in the dimensions of openings so that the pressure of material streams flowing through different openings varies within a wide range. Consequently, the rate at which the plastic material fills the space or spaces upstream of the extrusion orifice fluctuates with resulting adverse effect upon the quality of the parison. Still further, the parts of the core holder, especially of the ring between the two sets of spokes of a composite core holder, exhibit a pronounced elasticity in response to lateral stresses which, in turn, affects the configuration of the extrusion orifice so that the thickness of the parison wall varies, as considered in the circumferential direction of the orifice.

It was further proposed to utilize a short disk-shaped core which is inserted into a relatively short cupped outer housing and is held in position by several screws extending in parallelism with the axis of the extruder head. Such heads are used for the making of large-diameter parisons. The plastic material flows axially toward the central portion of the rear end of the core and the screws extend rearwardly from the core toward and into the housing (see German Utility Model No. 6,606,178) or vice versa (see German Utility Model No. 1,984,772). The just described extruder heads are not suited for the making of parisons which are to be introduced into the mold or molds of a blow molding machine, especially if the material of the parisons is a synthetic thermoplastic substance of high molecular weight and if the extruder head is to be formed with a reciprocable piston behind an annular material-accumulating space between the outer housing and the core.

SUMMARY OF THE INVENTION

An object of the invention is to provide a novel and improved head for the extrusion of tubular parisons wherein the dimensions (especially the diameter) of the outer housing are a fraction of dimensions of outer housings in conventional extruder heads for the making of similarly dimensioned parisons, and which is constructed and assembled in such a way that the diameter of the mass of plasticized material flowing toward the extrusion orifice does not appreciably exceed the diameter of the parison.

Another object of the invention is to provide an extruder head wherein the cross-sectional area of the extrusion orifice can be selected and varied with a high degree of precision and with a high degree of reproducibility, wherein the holder means for securing the core in a desired position with respect to the outer housing of the extruder head is simpler, less expensive, capable of being machined with a higher degree of precision, more rugged and more compact than in heretofore known extruder heads, and which offers a relatively low resistance to the flow of plasticized material toward the extrusion orifice.

A further object of the invention is to provide an extruder head wherein pressure losses (as a result of resistance to flow of plasticized material toward the orifice) are much less pronounced than in heretofore known extruder heads, and wherein the configuration of unavoidable constrictions in the path of material flowing toward the orifice is such that the period of dwell of material in such constrictions is a fraction of the period of dwell of material in heretofore known extruder heads.

An additional object of the invention is to provide an extruder head wherein the position of the core relative to the outer housing can be selected and maintained with a higher degree of precision than in heretofore known extruder heads, wherein the core is reliably held against lateral deflection or elastic deformation during extrusion and which, owing to its just outlined superior characteristics, can furnish parisons whose wall thickness matches (or deviates only negligibly from) an optimum or desired wall thickness.

Still another object of the invention is to provide the extruder head with novel and improved holder means for securing the core to the inner housing.

Another object of the invention is to provide the extruder head with novel and improved means for adjusting the rate of material flow along several paths toward and into the extrusion orifice.

A further object of the invention is to provide an extruder head which can be used as a superior substitute for the heads of existing extruder apparatus, especially apparatus which supply parisons to the open-and-shut mold or molds of a blow molding machine.

The invention is embodied in an apparatus for making tubular parisons of synthetic thermoplastic material, especially for supplying pendant parisons to the open-and-shut molds of blow molding machines. More particularly, the invention relates to an extruder head which forms part of the extruder apparatus and comprises a hollow outer housing (e.g., an elongated barrel or cylinder and an annular piston reciprocably received in the cylinder) which has front and rear end portions, and inner housing (which may include an elongated tubular member rigid with the cylinder of the outer housing) having a material-admitting channel and a forward portion (e.g., an annular sleeve secured to the tubular member) which extends into the rear end portion of the outer housing, and a core coaxially received in the outer housing and having a rear end (e.g., a sleeve rigid with the main portion of the core) adjacent to the forward portion of the inner housing and a front end (e.g., a cap threadedly secured to the main portion of the core) which defines with the front end portion of the outer housing an annular extrusion orifice. The core and the outer housing further define an elongated annular compartment which communicates with the extrusion orifice.

The extruder head further comprises holder means for securing the core to the inner housing. The securing means comprises a preferably cupped section disposed between the forward portion of the inner housing and the rear end of the core. The forward portion of the inner housing defines with the section a first chamber through which the material can flow from the channel, substantially radially outwardly of the core and toward the annular compartment. The rear end of the core defines with the section a second chamber through which the material can flow radially outwardly of the core toward the annular compartment. The section has a preferably centrally located opening or port which communicatively connects the second chamber with the first chamber. The securing means further comprises a first group (preferably an annulus) of bolts or analogous coupling elements which are spaced apart from each other, extend across the first chamber and connect the section only to the inner housing. Still further, the securing means comprises a second group (preferably an annulus) of coupling elements which are spaced apart from each other, extend across the second chamber and connect the section only to the core. The coupling elements are parallel or at least nearly parallel to the axis of the core.

A portion of the annular compartment surrounds the section of the securing means, and the material which flows from the channel into the first chamber, and some of which also flows from the first chamber into the second chamber (by way of the opening in the section), thereupon flow substantially radially of the respective chambers and into the adjacent parts of the annular compartment. The two masses of material are mixed with each other and homogenized upstream of the extrusion orifice.

The novel features which are considered as characteristic of the invention are set forth in particular in the appended claims. The improved extruder head itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a fragmentary axial sectional view of a second extruder head; and

FIG. 4 is a fragmentary axial sectional view of a third extruder head.

DESCRIPTION OF THE PREFERRED EMBODIMENTS

Figures 1, 2:
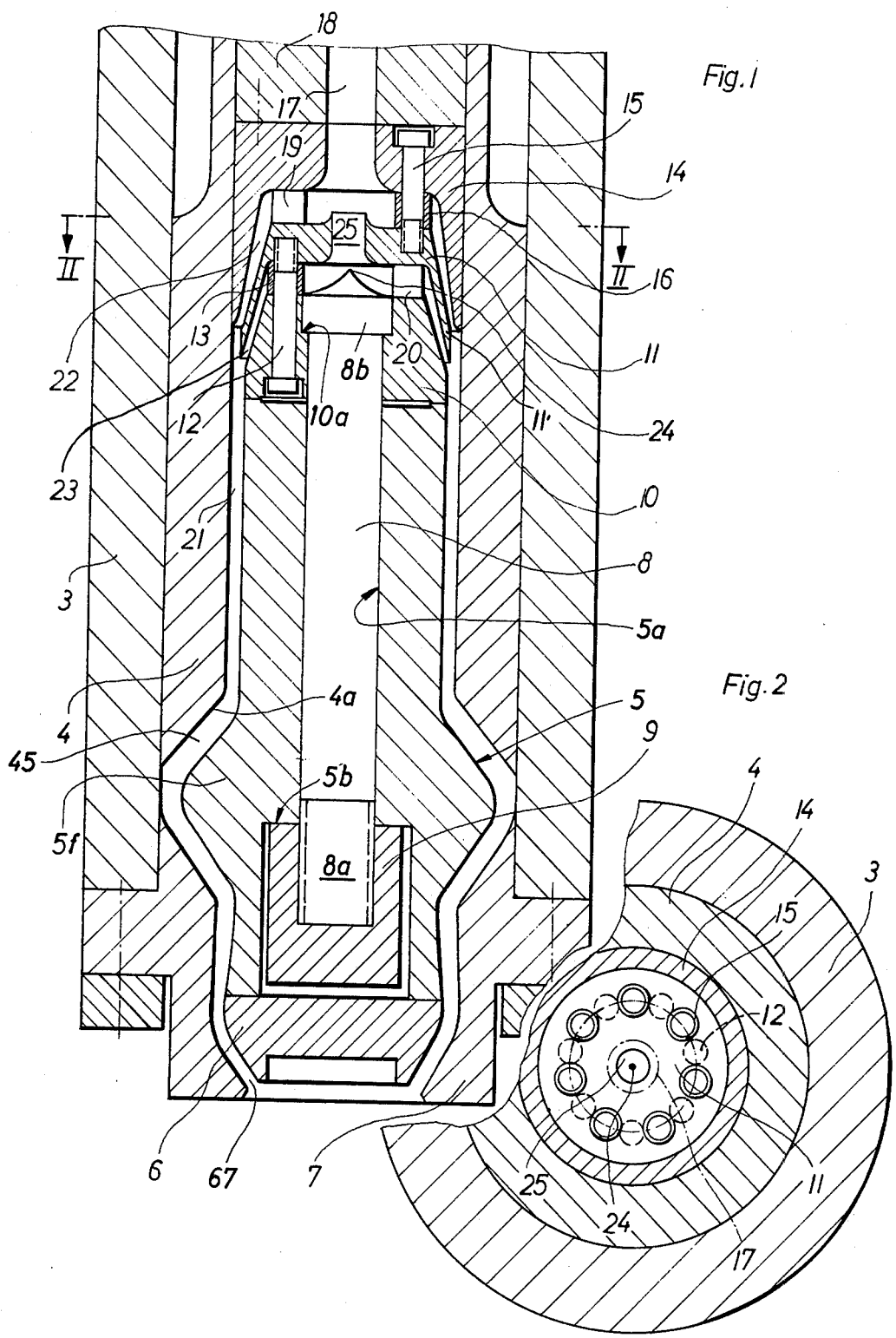
FIG. 1 is a fragmentary axial sectional view of an extruder head which embodies one form of the invention.
FIG. 2 is a fragmentary transverse sectional view, substantially as seen in the direction of arrows from the line II—II of FIG. 1.

Referring first to FIGS. 1 and 2, there is shown an extruder head which comprises a tubular outer housing including a cylinder or barrel 3 for a reciprocable annular piston 4 which is movable in and counter to the direction of extrusion of a tubular parison through the orifice 67. The piston 4 moves counter to such direction in response to pressure of plasticized material which accumulates in a space 45 between the front end face 4a of the piston and a circumferential bead 5f of an elongated die member or core 5, and the piston if thereupon pushed forwardly by a suitable fluid-operated (preferably hydraulic) servomotor, not shown. The aforementioned extrusion orifice 67 is defined by the front end 6 of the core 5 and a preferably separable (threadedly connected) annular front end portion 7 of the cylinder 3 of the outer housing. The connection between the front end 6 and the main or central portion of the core 5 preferably includes screw threads, not shown. The core 5 has an axial bore 5a for an elongated rod 8 having an externally threaded front end portion 8a in mesh with a nut 9 which abuts against an internal shoulder 5b of the core. The rear end portion 8b or the rod 8 constitutes a collar which abuts against an internal shoulder 10a of a sleeve-like annular rear end 10 of the core 5. Thus, the main portion of the core 5 is held in permanent abutment with the front end face of the rear end 10 due to the fact that its internal shoulder 5b is engaged by the upper end face of the nut 9 and that the head 8b of the rod 8 abuts against the shoulder 10a.

The core holder or securing means comprises a cupped section 11 located between the sleeve-like forward portion 14 of an inner housing 14, 18 and connected to the rear end 10 of the core 5 by an annulus or group of spaced-apart parallel coupling elements 12 here shown in the form of threaded bolts each having a head received in a recess of the front end face of the rear end 10 of the core and a shank whose threads mate with threads in tapped blind bores machined into the front end face of the section 11. Distancing sleeves 13 surround portions of the shanks of bolts 12 to maintain the rear end face of the rear end 10 at a fixed distance from the front end face of the section 11.

The core holder or securing means still further comprises an annulus or group of coupling elements or bolts 15 which extend in parallelism with the axis of the core 5 and connect the section 11 to the forward portion 14 of the inner housing 14, 18. Each bolt 15 has a head which is received in a recess machined into the rear end face of the forward portion 14 and a shank having threads which mesh with threads in tapped blind bores machined into the rear end face of the section 11. Portions of the shanks of bolts 15 are surrounded by distancing sleeves 16 which maintain the section 11 at a fixed distance from the forward portion 14. The forward portion 14 is bolted, screwed or otherwise fixedly secured to the front end portion of an elongated tubular member 18 which defines an axial channel 17 for admission of plasticized synthetic thermoplastic material into the extruder head. The outer housing 3 and the tubular member 18 are assumed to be secured to the body of the the extruder apparatus, and the tubular member 18 is surrounded by the rear portion of the annular piston 4. The rear end portion of the tubular member 18 can be attached to a hydraulic cylinder and piston unit or to other suitable adjusting means which can move the tubular member axially (with the parts 14, 11, 10, 5–6) relative to the housing portion 7 to thus vary the effective cross-sectional area of the extrusion orifice 67. The inner housing including the parts 14 and 18 can but need not be movable axially of the outer housing 3, 4 and carries the rear end or sleeve 10 through the medium of the bolts 12, 15 and section 11. The rear portion of the inner housing 14, 18 may be rigid with the cylinder 3.

The distribution of the two annuli of bolts 12, 15 is illustrated in FIG. 2. It will be noted that the bolts 12 are offset with respect to the bolts 15, as considered in the circumferential direction of the rod 8. The distancing sleeves 16 on the shanks of the bolts 15 insure that the section 11 and forward portion 14 define a rear chamber 19 whose general plane is substantially normal to the axis of the extruder head, and the distancing sleeves 13 on the shanks of the bolts 12 insure that the section 11 and rear end 10 define a similar front chamber 20. The rear chamber 19 communicates directly with the discharge end of the channel 17, and the front chamber 20 communicates with the channel 17 and rear chamber 19 by way of a centrally located opening or port 25 in the section 11. The outermost portions of the chambers 19, 20 respectively communicate with an elongated annular compartment 21 defined by the external surface of the core 5 and the internal surface of the piston 4 by way of two conical connecting passages 22, 23 which diverge in the direction of flow of plastic material from the channel 17 toward the orifice 67.

Plastic material which is supplied by the tubular member 18 via channel 17 flows radially outwardly in the rear chamber 19 whereby it forms several streams which flow through the short gaps between neighboring distancing sleeves 16 on the bolts 15 and enter the passage 22 on their way into the rear portion of the compartment 21. Some plastic material which is furnished by the channel 17 of the tubular member 18 flows centrally through the chamber 19, thereupon through the opening 25 of the section 11, radially outwardly through the chamber 20 to form several streams passing through the short gaps between neighboring distancing sleeves 13 on the bolts 12, and enters the compartment 21 via conical passage 23. Any traces of discrete streams which develop as result of flow of plastic material between the distancing sleeves 16 in the chamber 19 and the distancing sleeves 13 in the chamber 20 disappear on entry into the annular compartment 21. Such disappearance of streams if promoted by the fact that the bolts 12 of the front annulus are angularly offset with respect to the bolts 15 of the rear annulus.

The section 11 of the core holder or securing means has a ring-shaped marginal portion 11' which is disposed between the passages 22, 23 whose diameters increase gradually from the outermost portions of the respective chambers 19, 20 toward the corresponding portions of the compartment 21. The length of passages 22, 23 (as considered in the direction of material flow from the chambers 19, 20 toward the compartment 21) and the minimum widths of these passages are selected with a view to insure that they offer identical or nearly identical resistance to the flow of plastic material from the chambers 19, 20 toward and into the compartment 21. The diameter of the opening 25 in section 11 is smaller than the diameter of the channel 17, and the ratio of these diameters is such that not only the chamber 19 but also the chamber 20 is invariably filled with plastic material when the material flows from the channel 17 toward the compartment 21 and thence toward and into the orifice 67.

The rear end of the collar 8b on the rod 8 has a pointed tip 24 which extends toward the central opening 25 and contributes to uniform distribution of plastic material in the chamber 20. Such material enters the central portion of the chamber 20 by way of the opening 25 in the section 11.

The provision of cupped section 11, together with the two annuli of bolts 12 and 15 which respectively connect the section 11 to the core 5 and inner housing 14, 18, insures that the extruder head defines two chambers 19, 20 wherein the plasticized material flows radially outwardly at two different distances from the extrusion orifice 67. The bolts 12 and 15 constitute the only means for connecting the section 11 to the core and to the inner housing, and the periphery of the section 11 is surrounded by plasticized material which issues from the chamber 19 and flows through the conical connecting passage 22 and forwardly through the rear portion of the compartment 21. The inflow of plasticized material into the chambers 19 and 20 takes place in the axial direction of the extruder head, i.e., the chamber 19 receives material from the axial channel 17 of the tubular member 18 and the chamber 20 receives material through the central opening 25 of the section 11.

Due to the fact that the section 11 of the core holder or securing means is connected to the core 5 and inner housing 14, 18 exclusively by means of two annuli of bolts which are parallel or nearly parallel to the axis of the extruder head, the outer diameter of the cylinder 3 is relatively small, even if the outer housing of the extruder head further comprises an annular piston and is formed with a material-collecting space (45) at the front end face 4a of such piston. The dimensions of the outer housing can be reduced well below those in conventional extruder heads for the making of similarly dimensioned parisons while the cross-sectional area of each gap between neighboring bolts 12 and 15 is sufficiently large and sufficiently short to avoid excessive pressure losses due to resistance of plastic material to the flow between the bolts 12, 15 and into the conical passages 22, 23. In other words, the periods of dwell of plastic material in the gaps between the bolts 12 and 15 are surprisingly short, only a small fraction of periods of dwell of plastic material in the openings of the aforedescribed conventional extruder heads. Therefore, pressure losses and the resistance of plastic material to the flow through the gaps between the bolts 12, 15 are also a minute fraction of pressure losses and resistance which can be observed in heretofore known extruder heads. The molecular orientation of plasticized material which forms the streams flowing between bolts 12 and 15 is negligible.

Another important advantage of the improved extruder head is that the core 5 can be centered and remains centered in a simple and space-saving manner. Moreover, the bolts 12, 15 (which are parallel or nearly parallel to the axis of the extruder head) prevent any, or allow only minute, lateral deflection of the core; this will be readily understood since the bolts are subjected primarily or exclusively to tensional stresses.

The component parts of the improved extruder head can be machined in turning lathes with a high degree of precision (the majority of such components parts are rings, cylinders or tubes) so that the likelihood of uneven distribution of pressures due to manufacturing tolerances is negligible.

A further important advantage of the improved extruder head is that the cross-sectional area of the compartment 21 is relatively large in the region where this compartment receives plasticized material from the chambers 19, 20 (via passages 22, 23); therefore, the cross-sectional area of the compartment 21 can remain constant all the way to the extrusion orifice or to the annular material-collecting space 45 in front of the piston 4. In other words, it is not necessary to increase the diameter of the compartment 21 in the direction of material flow toward the extrusion orifice.

The provision of two annuli of bolts which are arrayed in such a way that the bolts of one annulus are angularly offset with respect to the bolts of the other annulus exhibits the additional advantage that the distribution of material in the conical connecting passages 22, 23, and especially in the compartment 21, is surprisingly uniform. This, in turn, insures that the wall thickness of the parison is constant, as considered in the circumferential direction of the front end 6 of the core.

The conicity of connecting passages 22 and 23 is attributable to the fact that the section 11 of the core holder resembles a cup. The width of the passages 22, 23 is preferably less than the height or depth (as considered in the axial direction of the extruder head) of the chambers 19 and 20. Plasticized material flows radially outwardly during travel from the channel 17 or opening 25 toward the rear portions of the passages 22, 23 and thereupon forwardly and outwardly during travel toward the corresponding portions of the compartment 21. The material streams which develop during flow in the chambers 19, 20 (i.e., between the distancing sleeves 13 and 16) merge even before they reach the rear ends of the respective passages 22, 23 and the mass of material is completely homogenized before it reaches the space 45. As mentioned before, the resistance which the passage 22 offers to the flow of material from chamber 19 into the rearmost portion of the compartment 21 preferably equals or closely approximates the resistance which the material encounters during flow from the chamber 20, via passage 23 and into the compartment 21.

Instead of utilizing the rod 8 as a means for regulating the rate of material flow into the chamber 20, the improved extruder head may be provided with means for moving the section 11 of the core holder toward or away from the neighboring parts 10 and 14, i.e., with means for increasing the axial length of the chamber 19 while simultaneously reducing the axial length of the chamber 20, or vice versa.

The connecting passages 22 and 23 are preferably long to insure more satisfactory homogenization of plasticized material which enters the rear ends of these passages in the form of discrete streams. This can be achieved (without unduly increasing the outer diameter of the cylinder 3) by utilizing a cupped section 11 whose diameter increases in the direction of material flow from the chambers 19, 20 toward the compartment 21. The central portion of the section 11 is preferably a relatively large disk (i.e., the rear part of the marginal portion 11' is preferably close to the internal surface of the piston 4 so that the portion 11' resembles a slightly tapering hollow cylinder); this is desirable and advantageous because the extruder head may be equipped with a relatively large number of large-diameter bolts 12 and 15 to thereby enhance the stability of the core, especially against lateral stresses. In other words, the diameters of the two annuli of bolts 12 and 15 are preferably large and each bolt preferably comprises a large-diameter shank which can offer a highly satisfactory resistance to lateral and/or axial displacement of the core 5.

FIG. 3 shows a modified extruder head wherein all such parts which are identical with or clearly analogous to corresponding parts of the first extruder head are denoted by similar reference characters. The annular piston 4 is reciprocable in the cylinder 3 of the outer housing and defines therewith an annular material-accumulating space 41 forming part of the annular compartment 39 which surrounds the core 5. The manner in which the front end of the core 5 and the front end portion of the cylinder 3 define a ring-shaped extrusion orifice is preferably the same as shown in FIG. 1.

The holder or securing means for the core 5 includes a cupped section 11 which is connected to the rear end of the core by an annulus of bolts or analogous coupling elements 12 whose shanks are surrounded by distancing sleeves 33. The section 11 is connected to the forward portion 14 of the inner housing by a second annulus of bolts 15 whose shanks are surrounded by distancing sleeves 34. The forward portion 14 is rigid with (e.g., screwed or bolted to) the tubular member 18 which defines the material admitting channel 17. The parts 14 and 18 together constitute the inner housing which can be moved up or down to thereby change the cross-sectional area of the extrusion orifice between the cylinder 3 and the core 5. The tubular member 18 contains a static mixing device 35 for the material which flows toward the rear chamber 19 between the section 11 and forward portion 14 and (through the opening or port 25) into the front chamber 20 between the rear end of the core and the section 11.

The rod 8 of FIG. 1 is replaced with an elongated rod-shaped regulating member 36 having an externally threaded front end portion 37 in mesh with internal threads of the core 5 and a pointed tip 24 extending into the opening 25 of the section 11. The foremost portion of the regulating rod 36 has a polygonal (e.g., square) outline, as at 38, so that it can be engaged and rotated by a suitable tool upon detachment of the front end (see 6 in FIG. 1) of the core. For example, the tip 24 can be moved to a position 24' which is indicated by phantom lines. This renders it possible to vary the effective cross-sectional area of the opening 25, i.e., the rate of material flow from the channel 17 and chamber 19 into the chamber 20. In other words, the operator can regulate the ratio of material flow from the channel 17 into the chambers 19 and 20, preferably in such a way that the rate of flow through the chamber 19 matches the rate of material flow through the chamber 20.

The material which leaves the chambers 19 and 20 flows through the conical connecting passages 22, 23 and the two bodies of material are united in the rear portion of the annular compartment 39. The rear portion of the compartment 39 is surrounded by a forwardly extending annular skirt 40 of the portion 14; as shown, the skirt 40 extends forwardly beyond the discharge end of the compartment 23. This skirt prevents the piston 4 from moving plastic material back and forth during movement relative to the cylinder 3. Recurrent forward and backward movements of plastic material could alter the ratio of material discharge via compartments 22 and 23. The two bodies of plastic material merge into each other before they enter the annular space 41 at the front end face of the piston 4.

The two annuli of bolts 12, 15 which connect the core 5 to the section 11 and the section 11 to the portion 14 are preferably staggered with respect to each other in the same way as shown for the bolts 12 and 15 of FIG. 2.

FIG. 4 shows a portion of a third extruder head wherein the configuration of the upper end of the core 5, of the section 11 and forward portion 14 is such that the chambers 19' and 20' do not extend substantially radially of (at right angles to) the axis of the extruder head. Thus, the angle alpha between the direction of material flow through the chambers 19', 20' and the axis of the core 5 is an acute angle, for example, an angle of between 30° and 75°.

The structure of FIG. 4 insures an even more satisfactory flow of plasticized material through the chambers 19', 20' toward the annular compartment 39. In fact, the configuration of the section 11 may be such that the extruder head of FIG. 4 need not have any pronounced connecting compartments because the outer or forward ends of the chambers 19', 20' discharge directly into the adjoining portions of the compartment 39.

The extruder heads of FIGS. 3 and 4 exhibit the important advantage that reciprocatory movements of the piston 4 relative to the cylinder 3 of the outer housing cannot undesirably influence the flow of plastic material toward the extrusion orifice, especially in the region where the material issues from the connecting passages 22 and 23. Such advantage is achieved by the simple expedient of extending the inner housing (in the embodiments of FIGS. 3 and 4 the forward portion 14 of the inner housing) so that the inner housing forms a skirt 40 which projects forwardly beyond the locus where the material which leaves the front chamber 20 or 20' enters the compartment 39. The skirt 40 insures a highly desirable homogenization of material which issues from the chambers 19, 20 or 19', 20' before such material reaches the annular space 41 in front of the piston 4. Thus, the material which issues from the rear chamber 19 or 19' merges into the material which issues from the chamber 20 or 20' while it advances within the confines of the skirt 40.

A mixing device according to the device 35 of FIG. 3 is fully described in the publication "Why all the fuss about motionless mixing?" by Sandra M. Skoblar in the periodical Plastics Technology of October 1974, Bill Brothers Publicity Corp., New York.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. In an apparatus for making tubular parisons of synthetic thermoplastic material, an extruder head comprising a hollow outer housing having front and rear end portions; an inner housing having a material-admitting channel and a forward portion extending into said rear end portion; a core coaxially received in said outer housing and having a rear end adjacent said forward portion and a front end defining an annular extrusion orifice with said front end portion, said core and said outer housing further defining an elongated annular compartment communicating with said orifice; and means securing said core to said inner housing, including a section disposed between said forward portion and said rear end, said section and said forward portion defining a first chamber through which the material can flow from said channel toward said compartment, said section and said rear end defining a second chamber through which the material can flow toward said compartment and said section having an opening communicatively connecting said first chamber with said second chamber, a first group of spaced-apart coupling elements extending across said first chamber and connecting said section to said inner housing, and a second group of spaced-apart coupling elements extending across said second chamber and connecting said section to said core, said coupling elements being substantially parallel to the axis of said core.

2. An extruder head as defined in claim 1, wherein said compartment has a portion which surrounds said section and said opening is disposed centrally of said section, said channel being coaxial with said core.

3. An extruder head as defined in claim 2, wherein said coupling elements include bolts and said bolts constitute the sole means for securing said section to said inner housing and said core, the material which is supplied by said channel flowing substantially radially of said core through said first chamber and into said compartment as well as substantially axially of said core from said first chamber, through said opening and into said second chamber and thereupon substantially radially of said core through said second chamber and into said compartment to merge into and to be homogenized with material which enters said compartment by way of said first chamber.

4. An extruder head, particularly for supplying pendant parisons to the molds of blow molding machines as defined in claim 1, wherein said inner housing is rigid with a portion of said outer housing.

5. An extruder head as defined in claim 1, wherein at least some coupling elements of said first group are offset with respect to at least some coupling elements of said second group, as considered in the circumferential direction of said core.

6. An extruder head as defined in claim 5, wherein the coupling elements of each of said groups form an annulus with gaps between neighboring coupling elements.

7. An extruder head as defined in claim 1, wherein said section is a cup having a ring-shaped marginal portion extending forwardly toward said orifice, said marginal portion respectively defining with said forward portion and said rear end a first and a second annular passage respectively connecting said compartment with said first and second chambers.

8. An extruder head as defined in claim 7, wherein the height of said first and second chambers, as considered in the axial direction of said core, exceeds the width of the respective passages.

9. An extruder head as defined in claim 7, wherein said marginal portion of said section diverges substantially conically toward said extrusion orifice.

10. An extruder head as defined in claim 1, wherein said outer housing includes a cylinder and an annular piston reciprocable in said cylinder, said piston having a front end face defining with said cylinder and said core an annular space constituting an enlarged portion of said compartment intermediate said second chamber and said orifice.

11. An extruder head as defined in claim 10, wherein said inner housing has a tubular skirt extending forwardly beyond said chambers and surrounding that portion of said compartment which is disposed between said chambers, said piston slidably surrounding said skirt and extending forwardly thereof toward said orifice.

12. An extruder head as defined in claim 1, wherein said chambers extend substantially radially of said core.

13. An extruder head as defined in claim 1, wherein the directions in which the material flows through at least one of said chambers toward said compartment make oblique angles with the axis of said core.

14. An extruder head as defined in claim 13, wherein said oblique angles are acute angles.

15. An extruder head as defined in claim 1, wherein said section further defines with said forward portion a first annular passage wherein the material flows from said first chamber into said compartment, said section and said rear end defining a second annular passage through which the material flows from said second chamber into said compartment, the lengths and minimum widths of said passages being such that the resistance which the material encounters during flow through one of said passages equals or closely approximates the resistance encountered by material flowing through the other of said passages.

* * * * *